# 2,952,677
AMINOGUANADINE COMPOUNDS

Stanley Birtwell, Roy Frederick Maisey, and Dora Nellie Richardson, Manchester, England, assignors to Imperial Chemical Industries Limited, London, England, a corporation of Great Britain No Drawing. Filed Sept. 17, 1957, Ser. No. 684,411

Claims priority, application Great Britain Oct. 1, 1956

7 Claims. (Cl. 260—240)

This invention relates to new organic compounds and more particularly it relates to new guanidine compounds which possess thereapeutic properties especially in the treatment of allergic and inflammatory conditions.

According to the invention, we provide the said new guanidine compounds which, in one of their tautomeric forms, may be represented by the formula:

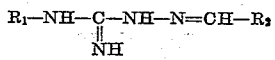

wherein $R_1$ and $R_2$ stand for aryl radicals which may optionally bear substituents provided that $R_1$ and $R_2$ do not both stand for an unsubstituted phenyl radical.

As suitable guanidine compounds of the above stated formula there may be mentioned for example N'-phenyl-$N^2$-4'-dimethylaminobenzylideneaminoguanidine, N'-3-methylphenyl - $N^2$ - 4'-acetamidobenzylideneaminoguanidine, N' - 3:4-dimethylphenyl-$N^2$-4'-dimethylaminobenzylideneaminoguanidine, N' - 4 - methylphenyl - $N^2$-4'-dimethylaminobenzylideneaminoguanidine, N' - 4 - methylphenyl - $N^2$-3':4' - methylenedioxybenzylideneaminoguanidine, N' - 2:4 - dimethylphenyl - $N^2$-4'-methoxybenzylideneaminoguanidine, N' - 4-chlorophenyl-$N^2$-3:4'-methylenedioxybenzylideneaminoguanidine, N' - 4-methoxyphenyl-N'-4'-dimethylaminobenzylideneaminoguanidine, N'-4-chlorophenyl - $N^2$-4' - acetamidobenzylideneaminoguanidine, N' - 5:6:7:8-tetrahydro-2-naphthyl-$N^2$-4'-dimethylaminobenzylideneaminoguanidine and N' - 3 - methyl-4-chlorophenyl - $N^2$ - 4' - dimethylaminobenzylideneaminoguanidine.

According to a further feature of the invention we provide a process for the manufacture of the said new guanidine compounds which comprises interaction of an aminoguanidine of the formula:

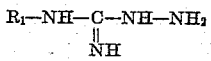

wherein $R_1$ has the meaning stated above, with an aldehyde of the formula:

$$R_2—CHO$$

wherein $R_2$ has the meaning stated above.

In the said process, the aminoguanidine may advantageously be used in the form of a salt thereof for example the hydrochloride, hydrobromide or hydriodide, and the aldehyde may, if desired, be used in the form of a functional derivative thereof for example in the form of its bisulphite derivative. The reaction may also conveniently be carried out in the presence of an inert diluent or solvent for example, water or lower aliphatic alcohols for example methanol, ethanol, propanol or butanol and the reaction may be accelerated or completed by the application of heat.

As stated above, the new guanidine compounds possess useful therapeutic properties especially in the treatment of allergic and inflamatory conditions for example in such conditions as asthma, hay fever, and allergic eczemas and purpuras. They may thus be used as the active ingredient in the formulation of pharmaceutical compositions for example in the form of tablets, solutions or creams.

The invention is illustrated but not limited by the following examples in which the parts are by weight:

Example 1

3 parts of p-dimethylaminobenzaldehyde are added to a solution of 3 parts of N'-phenyl-$N^2$-aminoguanidine dihydrochloride in 10 parts of butanol and the mixture is heated under reflux for 5 minutes. The solution is cooled and diluted with butanol, saturated with hydrogen chloride, until precipitation is complete. The mixture is filtered and the solid residue is crystallised from a mixture of butanol, saturated with hydrogen chloride, and petroleum ether, B.P. 60–80° C., to give N'-phenyl-$N^2$-p-dimethylaminobenzylideneaminoguanidine hydrochloride, M.P. 182° C. with decomposition.

Example 2

3.3 parts of N'-4-acetamidophenyl-$N^2$-aminoguanidine hydriodide are suspended in 20 parts of ethanol and 1.49 parts of p-dimethylaminobenzaldehyde are added. The mixture is made acid to Congo red by the addition of 2 N. aqueous hydrochloric acid and is then kept at 18–23° C. for 12 hours. It is then diluted with 2 N. aqueous sodium hydroxide solution until precipitation is complete. The mixture is filtered and the solid residue is crystallised from a mixture of butanol and petroleum ether (B.P. 60–80° C.) to give N'-4-acetamidophenyl-$N^2$-4'-dimethylaminobenzylideneaminoguanidine, M.P. 214–216° C.

Example 3

1.4 parts of 3-hydroxybenzaldehyde are added to a solution of 3 parts of N'-4-methylthiophenyl-$N^2$-aminoguanidine dihydrochloride in the minimum amount of boiling methanol. The mixture is heated under reflux for 5 minutes and is then cooled. A 2 N. aqueous solution of sodium carbonate is added to the solution until precipitation is complete. The separated oil is agitated with water until it solidifies and it is then crystallised from a mixture of butanol, saturated with hydrochloric acid, and petroleum ether (B.P. 60–80° C.) to give N'-4-methylthiophenyl - $N^2$-3'-hydroxybenzylideneaminoguanidine hydrochloride, M.P. 210° C. with decomposition.

Example 4

2.5 parts of 4-nitrobenzaldehyde are added to a solution of 5 parts of N'-2:4-dimethylphenyl-$N^2$-aminoguanidine hydriodide in the minimum amount of boiling methanol. 0.2 part of 2 N. aqueous hydrochloric acid solution is added to the mixture which is then heated under reflux for 5 minutes. A 2 N. solution of sodium hydroxide in water is added to the cooled solution until precipitation is complete and the mixture is filtered. The solid residue is crystallised from butanol to give N'-2:4-dimethylphenyl - $N^2$ - 4'-nitrobenzylideneaminoguanidine M.P. 192–194° C.

Example 5

A solution of 2.54 parts of piperonol sodium bisulphite compound in the minimum of cold water is added to a solution of 2.2 parts of N'-4-chlorophenyl-$N^2$-aminoguanidine hydrochloride in 5 parts of ethanol. The mixture is heated to boiling and then made acid to Congo red with 2 N. aqueous hydrochloric acid. The mixture is filtered and the solid residue is crystallised from ethanol to give N'-4-chlorophenyl-$N^2$-3':4'-methylenedioxybenzylideneaminoguanidine hydrochloride, M.P. 234–236° C.

Example 6

2.3 parts of anisaldehyde are added to a solution of 5 parts of N'-2:4-dimethylphenyl-N²-aminoguanidine hydriodide in 10 parts of methanol and the mixture is heated under reflux for 3 minutes. A 2 N. solution of sodium hydroxide in water is added to the cooled reaction mixture until precipitation is complete. The mixture is filtered and the solid residue is crystallised from butanol to give N'-2:4-dimethylphenyl-N²-4'-methoxybenzylideneaminoguanidine, M.P. 178–180° C.

Example 7

3 parts of piperonol are added to a solution of 4 parts of N'-4-methylphenyl-N²-aminoguanidine hydrochloride in 5 parts of ethanol and the mixture is heated under reflux for 3 minutes. The reaction mixture is cooled and filtered and the solid residue is crystallised from isopropanol to give N'-4-methylphenyl-N²-3':4'-methylenedioxybenzylideneaminoguanidine hydrochloride M.P. 194–196° C.

Example 8

1.7 parts of 4-acetylaminobenzaldehyde are added to a hot solution of 3 parts of N'-3-methylphenyl-N²-aminoguanidine hydriodide in 10 parts of methanol and 0.1 part of concentrated aqueous hydrochloric acid is added to the hot mixture which is then allowed to stand until the temperature has fallen to 20° C. Aqueous 2 N. sodium hydroxide solution is added to the solution until precipitation is complete and the mixture is filtered. The solid residue is crystallised from aqueous methanol to give N' - 3 - methylphenyl - N² - 4' - acetylaminobenzylideneaminoguanidine, M.P. 180–182° C.

Example 9

2.96 parts of N'-4-fluorophenyl-N²-aminoguanidine hydriodide are dissolved in 24 parts of ethanol and 1.49 parts of p-dimethylaminobenzaldehyde are added. The solution is kept at 18–23° C. during 18 hours and then filtered. The solid residue so obtained is N'-4-fluorophenyl-N²-4'-dimethylbenzylideneaminoguanidine hydriodide as a crystalline solid, M.P. 212–213° C.

Example 10

1.49 parts of 4-dimethylaminobenzaldehyde are added to a solution of 3.08 parts of N'-4-methoxyphenyl-N²-aminoguanidine hydriodide in 24 parts of ethanol and the mixture is kept at 18–23° C. during 18 hours. Ether is then added to the solution when there is obtained N'-4-methoxyphenyl-N²-4'-dimethylaminobenzylideneaminoguanidine hydriodide, M.P. 186–187° C.

Example 11

2.4 parts of N'-4-tolyl-N²-aminoguanidine dihydrochloride and 1.5 parts of 4-dimethylaminobenzaldehyde are heated under reflux in 20 parts of ethanol during 2 hours. The reaction mixture is then cooled and filtered and the solid residue is washed with ethanol and dried to give N'-4-tolyl-N²-4'-dimethylaminobenzylideneaminoguanidine dihydrochloride, M.P. 232–233° C. with decomposition.

Example 12

3.3 parts of N'-5:6:7:8-tetrahydro-2-naphthyl-N²-aminoguanidine hydriodide and 1.5 parts of 4-dimethylaminobenzaldehyde in 24 parts of ethanol are heated under reflux for 2 hours. The solution is then cooled and poured into a mixture of aqueous ammonium hydroxide and ice. The mixture is filtered and the solid residue is washed with aqueous ammonia solution, then with water and dried. It is then crystallised from ethanol to give N' - 5:6:7:8 - tetrahydro - 2 - naphthyl-N² - 4' - dimethylaminobenzylideneaminoguanidine hydriodide, M.P. 143–145° C.

Example 13

6.1 parts of N'-3:4-dimethylphenyl-N²-aminoguanidine hydrochloride and 3.0 parts of 4-dimethylaminobenzaldehyde are dissolved in 48 parts of ethanol and the solution is kept at 18–23° C. during 18 hours. Dilute aqueous sodium hydroxide solution is added and the mixture is filtered. The solid residue is crystallised from aqueous ethanol to give N'-3:4-dimethylphenyl-N²-4'-dimethylaminobenzylideneaminoguanidine, M.P. 164–168° C.

Example 14

A solution of 6.5 parts of N'-4-chloro-3-methylphenyl-N²-aminoguanidine hydriodide and 3.0 parts of 4-dimethylaminobenzaldehyde in 48 parts of ethanol is kept at 18–23° C. during 18 hours. Ether is then added until a slight turbidity appears and the solution crystallises on further standing. There is thus obtained N'-4-chloro - 3 - methylphenyl - N² - 4' - dimethylaminobenzylideneaminoguanidine hydriodide, M.P. 197–200° C.

Example 15

4.4 parts of 4-chlorophenylaminoguanidine hydrochloride and 3.3 parts of 4-acetylaminobenzaldehyde are dissolved in 32 parts of ethanol and the solution is kept at 18–23° C. for 48 hours. It is then filtered and there is thus obtained N'-4-chlorophenyl-N²-4'-acetylaminobenzylideneaminoguanidine hydrochloride as a white crystalline solid, M.P. 288–290° C.

What we claim is:

1. A guanidine compound of the formula:

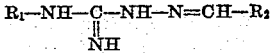

wherein $R_1$ is selected from the group consisting of phenyl, lower alkyl-phenyl, lower alkoxy-phenyl, halophenyl, lower alkylthiol-phenyl, acetamido-phenyl and 5:6:7:8-tetrahydro-2-naphthyl radicals and $R_2$ is a substituted phenyl radical selected from the group consisting of hydroxy-phenyl, lower alkoxy-phenyl, alkylene dioxy-phenyl, nitro-phenyl, acetamido-phenyl and lower dialkylamino-phenyl radicals.

2. N' - phenyl - N² - p - dimethylaminobenzylideneaminoguanidine hydrochloride.

3. N' - 4 - acetamidophenyl - N² - 4' - dimethylaminobenzylideneaminoguanidine.

4. N' - 4 - methylthiophenyl - N² - 3' - hydroxybenzylideneaminoguanidine hydrochloride.

5. N' - 2,4 - dimethylphenyl - N² - 4' - nitrobenzylideneaminoguanidine.

6. N' - 4 - chlorophenyl - N² - 3',4' - methylenedioxybenzylideneaminoguanidine hydrochloride.

7. N' - 2,4 - dimethylphenyl - N² - 4' - methoxybenzylideneaminoguanidine.

References Cited in the file of this patent

UNITED STATES PATENTS

| | | |
|---|---|---|
| 2,703,322 | Fox | Mar. 1, 1955 |
| 2,727,041 | Girard | Dec. 13, 1955 |

OTHER REFERENCES

Finnegan et al.: Chem. Abstracts, volume 48, pages 7006–7007 (1954).